US007598002B2

(12) United States Patent
Gorkovenko et al.

(10) Patent No.: US 7,598,002 B2
(45) Date of Patent: Oct. 6, 2009

(54) ENHANCED ELECTROCHEMICAL CELLS WITH SOLID-ELECTROLYTE INTERPHASE PROMOTERS

(75) Inventors: Alexander Gorkovenko, Mission Viejo, CA (US); Stephen Jaffe, Lake Forest, CA (US)

(73) Assignee: Material Methods LLC, Irvine, CA (US)

( * ) Notice: Subject to any disclaimer, the term of this patent is extended or adjusted under 35 U.S.C. 154(b) by 753 days.

(21) Appl. No.: 11/328,759

(22) Filed: Mar. 10, 2006

(65) Prior Publication Data

US 2006/0154144 A1 Jul. 13, 2006

Related U.S. Application Data

(60) Provisional application No. 60/643,059, filed on Jan. 11, 2005.

(51) Int. Cl.
*H01M 6/18* (2006.01)
(52) U.S. Cl. .................. 429/307; 429/188; 429/324; 429/347; 429/341; 429/342; 429/343; 429/338
(58) Field of Classification Search ............... 429/307, 429/188
See application file for complete search history.

(56) References Cited

U.S. PATENT DOCUMENTS

| | | | |
|---|---|---|---|
| 4,505,997 | A | 3/1985 | Armand et al. |
| 5,072,040 | A | 12/1991 | Armand |
| 5,198,204 | A | 3/1993 | Bottaro et al. |
| 5,254,324 | A | 10/1993 | Bottaro et al. |
| 5,415,852 | A | 5/1995 | Schmitt et al. |
| 5,659,080 | A | 8/1997 | Suzuki et al. |
| 5,780,769 | A | 7/1998 | Russell et al. |
| 5,976,483 | A | 11/1999 | Langlet et al. |
| 6,060,184 | A | 5/2000 | Gan et al. |
| 6,210,839 | B1 | 4/2001 | Gan et al. |
| 6,254,705 | B1 | 7/2001 | Anflo et al. |
| 6,350,545 | B2 | 2/2002 | Fanta et al. |
| 6,632,573 | B1 * | 10/2003 | Nimon et al. ............... 429/344 |
| 6,787,119 | B2 | 9/2004 | Choudary et al. |
| 6,863,751 | B1 | 3/2005 | Chan et al. |
| 2005/0147891 | A1 * | 7/2005 | Mikhaylik ................... 429/326 |
| 2008/0193835 | A1 * | 8/2008 | Mikhaylik ................... 429/156 |

FOREIGN PATENT DOCUMENTS

WO WO 03/006371 A1 1/2003

OTHER PUBLICATIONS

Ang, et al., "Synthesis, Characterization, and Crystal Structures of Cu, Ag, and Pd Dinitramide Salts," Z. Anorg. Allg. Chem. (2002), 628:2894-2900.
Astrat'ev, et al., "Kinetics and Mechanism of Acid-Catalyzed Decomposition of Dinitramide," St. Petersburg State Institute of Technology, Jul. 15, 1997.
Berger, et al., "Alkali Dinitramide Salts. Part 1: Synthesis and Characterization," Propellants, Explosives, Pyrotechnics 30 (2005), No. 3 pp. 184-190.
Bottaro, et al., "1,1,3,3-Tetraoxo-1,2,3-triazapropene Anion, a New OxyAnion of Nitrogen: The Dinitramide Anion and Its Salts," J. Am. Chem. Soc. (1997), 119:9405-9410.
Brough, John, "The Home of Ordnance and Energetics Excellence!" Energetics Manufacturing Technology Center, Ammonium Dinitramide Manufacturing Technology, www.ih.navy.mil.
Cliff, et al., "Evidence of Nitrate Formation from the Thermal Decay of Alkali Metal Dinitramides," Propellants, Explosives, Pyrotechnics 24 (1999), pp. 43-45.
Gilardi, et al., "A New Class of Flexible Energetic Salts: The Crystal Structures of the Ammonium, Lithium, Potassium, and Cesium Salts of Dinitramide," J. Am. Chem Soc. (1997), 119:9411-9416.
Haiges, et al., "An Improved Method for Product Separation in Metathetical Reactions and its Demonstration for the Synthesis of Anhydrous Cesium Salts," Z. Anorg. Allg. Chem. (2002), 628:1717-1718.
Malesa, et al., "Separation of Ammonium Dinitramide from Reaction Mixture," Propellants, Explosives, Pyrotechnics 24 (1999), pp. 83-89.
Jones, et al., "Characterization of ADN and ADN-Based Propellants," Propellants, Explosives, Pyrotechnics 30 (2005), No. 2 pp. 140-147.
Koch, Ernst-Christian, "Special Materials in Pyrotechnics: III. Application of Lithium and its Compounds in Energetic Systems," Propellants, Explosives, Pyrotechnics 29 (2004), No. 2 pp. 67-80.
Lei, et al., "The thermal behavior of potassium dinitramide. Part 1. Thermal stability," Thermochimica Acta 335 (1999) 105-112.
Nowinski, et al., "Structure of $LiN(CF_3SO_2)_2$, a Novel Salt for Electrochemistry," J. Mater. Chem. (1994), 4(10):1579-1580.
Ritchie, et al., "Dinitramide Ion: Robust Molecular Charge Topology Accompanies an Enhanced Dipole Moment in Its Ammonium Salt," J. Phys. Chem. B (2003), 107:14576-14589.
Stitzmann, et al., "Pentafluorosulfanylnitramide Salts," Inorg. Chem. (2000), 39:843-850.
Strunin, et al., "Combustion of Ammonium Dinitramide," Combustion and Flame (1999), 117:429-434.
Tompa, Albert S., "Thermal analysis of ammonium dinitramide (AND)," Thermochimica Acta 357-358 (2000), 177-193.
Velardez, et al., "Molecular dynamics studies of melting and liquid properties of ammonium dinitramide," Journal of Chemical Physics (2003), vol. 119, No. 13, pp. 6698-6708.

(Continued)

*Primary Examiner*—Melvin C Mayes
*Assistant Examiner*—Michael Forrest
(74) *Attorney, Agent, or Firm*—Peter J. Gluck (57) ABSTRACT

An electrochemical cell with an alkali metal containing anode having high discharge capacity, charge efficiency and low self-discharge. The addition of at least one nitramide or dinitramide salt of a metal cation to the electrochemical cell electrolyte unexpectedly lowers first cycle irreversible capacity, adds higher cycle life, lowers self-discharge and beneficially addresses several additional degrees of freedom with respect to electrolyte solvent selection while providing higher charge capacity. Additives include the lithium metal salts of nitramide or dinitramide, and the electrolyte consists essentially of a lithium metal salt dissolved in a at least one of an aqueous solvent, molten salt solvent system and a non-aqueous solvent mixture of at least one of organic ethers, esters, carbonates, acetals.

20 Claims, 5 Drawing Sheets

OTHER PUBLICATIONS

'Venkatachalam, et al., "An Overview on the Synthetic Routes and Properties of Ammonium Dinitramide (ADN) and other Dinitramide Salts," Propellants, Explosives, Pyrotechnics 29 (2004), No. 3 pp. 178-187.

Wingborg, et al., "Triaminoguanidine Dinitramide, TAGDN: Synthesis and Characterization," Propellants, Explosives, Pyrotechnics 28 (2003), No. 6 pp. 314-318.

Aurbach, et al; "Recent studies on the correlation between surface chemistry, morphology, three-dimensional structures and performance of Li and Li-C intercalation anodes in several important electrolyte systems:" Journal of Power Sources 1997, vol. 68, pp. 91-98.

Carter, et al; "Multifunctional Battery and Fuel Cell Composite Structures for U.S. Army Applications;" U.S. Army Research Laboratory, Weapons and Materials Research Directorate, Aberdeen Proving Ground, MD 21005-5069.

Ein-Eli, et al; "New Electrolyte System for Li-Ion Battery;" J. Electrochem. Soc., vol. 143, No. 9, Sep. 1996, pp. L195-L197.

Gorkovenko, et al; "Li/$Li_2S_x$ Liquid Cathode Cell;" Moltech Corporation, Tucson, Arizona.

Luk'yanov, et al; "Dinitramide and its salts 1. Synthesis of dinitramide salts by decyanoethylation of $N,N$-dinitro-$\gamma$-aminopropionitrile;" Russian Chemical Bulletin, vol. 43, No. 1, Jan. 1994 pp. 89-92.

* cited by examiner

Figure 1. Li dinitramide conductivity as a function of molar concentration in DME at room temperature.

Figure 2. 5th cycle charge and discharge capacity for Li ion cell with 1 M Li dinitramide EC:EMC 1:3 electrolyte. Constant current discharge; constant current charge until 4.2 V, followed by constant voltage charge at 4.2 V.

Fig. 3. Discharge capacity for Li ion cell with 1 M LiDN EC:EMC 1:3 electrolyte.

Figure. 4. 10th cycle charge and discharge capacity for a Li/S thin cell with 0.2 M Li dinitramide electrolyte.

Figure 5. Discharge capacity before and after 24 hrs rest in the charged state. Li/S cell with 1 M Liimide, DOL/DME 1/4 electrolyte, no Li dinitramide.

ENHANCED ELECTROCHEMICAL CELLS WITH SOLID-ELECTROLYTE INTERPHASE PROMOTERS

REFERENCE TO RELATED APPLICATIONS

The present application claims priority to U.S. Provisional Patent Application Ser. No. 60/643,059, filed Jan. 11, 2005, full Paris Convention priority is expressly reserved.

FIELD OF THE DISCLOSURE

The present disclosure generally relates to electrochemical cells, and more particularly to lithium electrochemical cells activated with electrolytes having an additive provided to achieve high battery charge capacity, cycle life, shelf life, specific energy, specific power, and low first cycle irreversible capacity loss.

REFERENCES

Attention is directed to the following, which are representative of the state of the art, but not limiting of the scope of the instant disclosure. Each of the following are expressly incorporated herein by reference, as if fully set forth herein.
  Ein-Eli, Y., J. Electrochem Soc. 143:195-197 (1996);
  Gorkovenko, A., et al., "Li/Li$_2$S$_x$ Liquid Cathode Cell," Abstract of 202nd ECS meeting, Salt Lake City, 126 (2002);
  Lukyanov, O., et al., Zelinski Institute of Organic Chemistry (USSR) (1971);
  Snyder, J. F., et al., Network Polymer Electrolytes For Use In Multifunctional Structures," PBFC-2 2$^{nd}$ International Conference on Polymer Batteries and Fuel Cells—Las Vegas, Nev., Jun. 12-17, 2005, ECS;
  U.S. Publication No. 2004/0197641;
  U.S. Publication No. 2004/0253510;
  U.S. Publication No. 2005/0175904;
  U.S. Publication No. 2005/0181286;
  U.S. Pat. No. 4,853,304;
  U.S. Pat. No. 5,254,324;
  U.S. Pat. No. 5,824,506;
  U.S. Pat. No. 5,976,483;
  U.S. Pat. No. 6,060,184;
  U.S. Pat. No. 6,210,839;
  U.S. Pat. No. 6,632,573; and,
  U.S. Pat. No. 6,911,280.

BACKGROUND OF THE DISCLOSURE

High specific energy batteries are enabled by alkali metal containing anodes. Lithium metal is particularly attractive as the anode of electrochemical cells because of its extremely high energy per unit weight, compared, for example, to anodes containing nickel or cadmium. These features are highly desirable for batteries for vehicles and portable electronic devices where a premium is paid for low weight. High specific energy batteries employ pure lithium, alloys of lithium, and intercalation compounds of lithium as anode active materials.

Both primary and secondary (non-rechargeable and rechargeable) batteries are made from lithium containing anodes. Common types of primary lithium batteries include: lithium/sulfur dioxide (Li/SO$_2$), lithium/thionyl chloride (Li/SOCl$_2$), lithium/manganese dioxide (LiMnO$_2$), lithium/carbon monofluoride (Li/(CF)$_n$), lithium/copper oxide (Li/CuO), and lithium/iodine (LiI$_2$), and lithium anode reserve batteries (including lithium/vanadium pentoxide, lithium/thionyl chloride, and lithium/sulfur dioxide styles). Common types of secondary lithium batteries include: lithium/sulfur (Li$_2$S$_x$), lithium/iron sulfide (LiFeS$_x$), lithium/manganese titanium (LiMnTi), lithium/polymer, lithium-ion (including lithium/cobalt oxide (LiCoO$_2$), lithium/nickel oxide LiNiO$_2$, and lithium/manganese oxide (LiMn$_2$O$_4$)), lithium-vanadium pentoxide (Li/V$_2$O$_5$), lithium/manganese dioxide (Li/MnO$_2$), and lithium/titanium disulfide (Li/TiS$_2$).

Unfortunately, the reactivity of lithium also results in side reactions, resistive film formation, and dendrite formation. These destructive processes reduce performance as measured by battery charge capacity, cycle life, shelf life, specific energy, specific power, and first cycle irreversible capacity loss.

Destructive processes may be controlled by the tailored formation of a solid-electrolyte interphase (SEI) that separates the lithium anode from the electrolyte, but still conducts lithium ions. The SEI formation is the result of the chemical reaction between electrolyte components and the anode surface.

Many different solutions have been proposed for the formation of robust, yet ion conductive SEI layers. One solution is additives of agents that will oxidize lithium metal and passivate the Li surface preventing further reaction. One known solution is to saturate electrolyte with CO$_2$. The saturation of electrolyte with CO$_2$ gas helps to reduce voltage delay in primary cells, and also increases cycle life in secondary cells (W. B. Ebner, et al., Electrolyte For Secondary Non-Aqueous Cell, U.S. Pat. No. 4,853,304).

Similar solutions include saturation of electrolyte with SO$_2$ gas (Y. Ein-Eli, J. Electrochem. Soc. 1996, 143, 195-197, and Nimon, et al., U.S. Pat. No. 6,632,573) and addition of ethylene sulfite (Kato, Toshimitsu, et al., U.S. Publication No. 20050181286) to improve shelf and cycle life of lithium batteries. Another example is additives of strong nitrogen containing oxidizing agents. For example, Gan, et al., describe in U.S. Pat. No. 6,060,184 and in U.S. Pat. No. 6,210,839 SEI layer enhancement for a lithium ion battery by the addition of inorganic and organic nitrates and nitrite compounds to an electrolyte comprising an alkali metal salt dissolved in a mixture of carbonate solvents. However, as will become clear to those skilled in the art, these solutions do not provide adequate redress as readily as the instant teachings.

Despite the various approaches proposed for the formation of the SEI, there remains a need for improved methods, which will allow for increased battery charge capacity, cycle life, shelf life, first cycle irreversible capacity loss, specific power, and specific energy. It is respectfully proposed that the instant disclosures address this longstanding need.

SUMMARY OF THE DISCLOSURE

It is commonly known that when an electrical potential is applied to lithium ion cells to initially charge the cell, some permanent capacity loss occurs due to the anode surface passivation film formation. This permanent capacity loss is called first cycle irreversible capacity. The film formation process is highly dependent on the reactivity of the electrolyte components at the cell charging potentials. The formation of a surface film is unavoidable for alkali metal systems, and in particular, lithium metal anodes, and lithium intercalated carbon anodes due to the relatively low electrochemical potential and high reactivity of lithium toward organic electrolytes.

The ideal SEI should be electron insulating and ion conducting. While most alkali metal, and in particular, lithium electrochemical systems meet the first requirement, the second requirement is difficult to achieve. The resistance of these films is not negligible, and as a result, impedance builds up inside the cell due to this surface layer formation, which induces unacceptable polarization during the charge and discharge of the lithium ion cell. On the other hand, if the SEI film is electrically conductive, the electrolyte decomposition reaction on the anode surface does not stop due to the low potential of the lithiated carbon electrode.

According to the present invention, the preferred additive is a dinitramide or in general nitramide compound, in a non-aqueous electrolyte solvent mixture of organic ethers, esters, carbonates, or acetals.

Hence, the composition of the electrolyte has a significant influence on the discharge efficiency of alkali metal systems, and particularly the permanent capacity loss in secondary cells. For example, when 1.0M $LiPF_6/EC:DMC=30:70$ is used to activate a secondary lithium cell, the first cycle irreversible capacity is approximately 35 mAh/g of graphite. However, under the same cycling conditions, the first cycle irreversible capacity is found to be approximately 65 mAh/g of graphite when 1.0M $LiPF_6/EC:DMC:EMC:DEC=45:22:24.8:8.2$ is used as the electrolyte. An object of the present invention is to further reduce the first cycle irreversible capacity of lithium ion batteries.

Another object of the present disclosure is creation of the SEI in the advanced lithium/sulfur cell with a liquid cathode. The $Li_2S_x$ liquid cathode presents a corrosive environment in direct contact with the Li metal anode. The existence of the Li/S battery is based on natural ability of Li surface to form dense passivation layers or SEI films while in contact with many organic and inorganic species. The chemical agents selected for Li surface passivation can make this film very stable and robust and these agents can be very efficient at low concentrations.

SEI promoters are reduced on the Li surface and form oligomeric films. Monomers, oligomers, surfactants, strong oxidizers are a few examples of interesting SEI promoters. 1,3-dioxolane (DOL) is the SEI promoter of the first generation of Li/S cell. Its function is to some extent similar to the role of EC in the Li Ion battery. The reactivity of $Li_2S_x$ is a function of its order and of the nature and concentration of SEI promoter used. The low order Li polysulfides such as $Li_2S_4$ and $Li_2S_6$ are relatively benign in DOL based electrolytes and self-discharge associated with $Li_2S_6$ is low (<0.5%/day, at room temperature, RT).

Passivation layer formation is somewhat analogous to behavior of an aluminum metal surface in air or Li metal in the Li/thionyl chloride primary cell. This SEI prevents sulfur species from directly reacting with the Li surface. SEI protection is necessary. Related attempts to protect and passivate alkali anodes are taught in U.S. Pat. No. 6,911,280 by De Jonghe, and U.S. Publication No. 20050175904 by Gorkovenko, which are incorporated herein by reference, expressly, as if fully set forth herein.

However, $Li_2S_8$ and higher order polysulfides are reactive enough to break the DOL based SEI film resulting in self-discharge rates up to 3%/hr. High order polysulfide formation accompanies high sulfur utilization. SEI breakdown limits the first generation of Li/S cell to only ~45% sulfur utilization. Cycle life of over 400 cycles was demonstrated for this version of Li/S battery (A. Gorkovenko, et al., "Li/Li$_2$S$_x$ Liquid Cathode Cell," Abst. of 202$^{nd}$ ECS meeting, Salt Lake City, #126, 2002). An object of the present disclosure is to provide better Li anode protection in the presence of corrosive species in battery electrolytes.

Another object of this disclosure is protection of alkali metal anodes in aqueous electrolytes used in battery chemistries such as the Li/air and Li/water and Li/metal hydride batteries. Nitramide and dinitramide salts of alkali metals are water soluble and stable in aqueous as well as non-aqueous systems. These salts provide both a passivation layer and electrolyte conductivity.

Previous attempts to protect lithium anodes from reaction with water include polymer coatings and multilayer laminate coatings as taught by Visco, et al., in U.S. Publication No. 20040197641. These previous attempts lack a conformal, self-assembling protective layer capable of adapting to the shrinking and expanding anode surface during discharge and charge. The present invention overcomes this shortcoming, and others as set forth herein and claimed below.

Another object of this disclosure is to protect metals from reacting with oxygen, nitrogen or moisture in ambient atmosphere thereby allowing reactive metals to be handled outside of a controlled atmosphere, such as a dry room. Previous attempts to protect lithium metal include passivation by incorporating multivalent anions in the lithium surface, as taught by Jonghe, Lutgard C. De, et al., in U.S. Publication No. 20040253510. Once again, this approach has neither proven to be commercially nor even empirically successful to date.

However, protection of metals by passivation through multivalent anions disposal in the lithium surface, given the instant improvements, may be relevant. Accordingly, such aspects of the instant disclosure are noted and recited as contemplated by the enhancements of the instant disclosure.

According to a feature of the present disclosure, there is provided an electrochemical cell, comprising, in combination a negative electrode containing at least one of an alkali metal, an alkali metal alloy, and material intercalating alkali metal, a positive electrode comprising a cathode active material which electrochemically reacts with alkali metal or intercalates an alkali metal, an electrolyte that activates negative and positive electrodes, and, wherein $R_1$ is a metal including alkali and alkaline earth metals, and R is an inorganic or organic group, at least one salt selected from the group consisting of dinitramide and nitramide salts of alkali and alkali earth metals, wherein each of the dinitramide salts (structures 1 and 3 below) and nitramide salts (structures 2 and 4 below) is represented by a following formula:

Another object is the combined use of nitramide salts as the source of electrical energy and as an energetic material, providing rapid release of mechanical energy. Combination of these properties will enable multi-functionality. For example, Li polymer batteries can also function as a construction or load-carrying element in an armored vehicle (J. F. Snyder, et al., "Network Polymer Electrolytes For Use In Multifunctional Structures," PBFC-2 2nd International Conference on Polymer Batteries and Fuel Cells—Las Vegas, Nev. Jun. 12-Jun. 17, 2005, ECS).

Likewise disclosed according to the instant disclosure is an alternate set of energy generating properties which unexpectedly releases mechanical energy faster and more prolifically than predicted. Such multifunctional aspects of the instant disclosure are also expressly contemplated to be within the scope of the instant teachings.

The motivation for dual function is to lower the total weight of the vehicle by sharing functionalities. Dinitramide salts provide high ionic conductivity and solubility in non-aqueous solvents used to formulate electrolytes for alkaline batteries. These electrolytes can also be specially formulated to act as an ignitable gas generator. Hence batteries with LiDN salts could also serve as active armor elements or provide thrust in a rocket, among other applications enabled by the smaller footprint.

According to the present disclosure, these objectives are achieved by adding nitramide additives to a electrolyte solvent, for example, a non-aqueous mixture of organic ethers, esters, carbonates, or acetals. In addition, those skilled will readily understand that the scope of the instant disclosure contemplates and expressly includes other nonaqueous organic electrolyte systems, such as binary solvent and ternary solvent systems and aqueous electrolyte systems.

The present inventors have discovered unexpected benefits with the improvement taught by the instant disclosure. It is hypothesized that the nitramide and dinitramide additives compete with the existing electrolyte components to react on the lithium containing anode surface to form a beneficial SEI film. It therefore follows that the resulting SEI film is electrically more insulating than the film formed without the additive and, as a consequence, the lithium-containing electrode is better protected from reactions with other electrolyte components. According to the teachings of the instant disclosure, lower first cycle irreversible capacity, higher cycle life, lower self discharge, greater flexibility in electrolyte solvent selection, and higher charge capacity, are obtained unexpectedly, in greater magnitudes and to higher degrees than those of skill would predict based upon empirical study, and literature review.

Briefly stated, an electrochemical cell with an alkali metal containing anode having high discharge capacity, charge efficiency and low self-discharge is disclosed. The addition of at least one nitramide or dinitramide salt of a metal cation to the electrochemical cell electrolyte unexpectedly lowers first cycle irreversible capacity, adds higher cycle life, lowers salt discharge and beneficially addresses several additional degrees of freedom with respect to electrolyte solvent selection while providing higher charge capacity. Additives include the lithium metal salts of dinitramide, and the electrolyte consists essentially of a lithium metal salt dissolved in a at least one of an aqueous, molten salt solvent system and a non-aqueous solvent mixture of organic ethers, esters, carbonates, acetals.

These and other objects of the present invention will become increasingly more apparent to those skilled in the art by reference to the following description of the teachings of the present disclosure and to the appended drawings, when read in light of the claims appended hereto.

BRIEF DESCRIPTION OF THE DRAWINGS

The above-mentioned features and objects of the present disclosure will become more apparent with reference to the following description taken in conjunction with the accompanying figures wherein like reference numerals denote like elements and in which.

DETAILED DESCRIPTION

The present inventors have discovered some of the unexpected benefits that flow from novel combinations of components of electrochemical cells, using solid-electrolyte interphase promoters. To these ends, an electrochemical cell constructed according to the present invention includes an anode active material selected from the alkali metals such as lithium, sodium, potassium, and an exemplary anode active material comprises lithium.

The difficulties encountered by the reactivity of lithium containing anode surfaces, for example, in a Li/S electrochemical cell during storage or cycling, may, according to the instant invention, be solved by the use of a dinitramide compound as a SEI promoter. The SEI thus formed allows passage of lithium ions while acting as a barrier to other cell components more effectively, than other single or dual layer interfacial films.

An exemplary embodiment of the present invention pertains to a Li anode electrochemical cell, wherein the anode comprises metallic lithium as reducing agent and the cathode comprises insoluble oxidizer, insoluble intercalating material such as $LiCoO_2$, $LiCoO_2/LiNiO_2$, $LiMnO_2$ 1/1/1, etc. or soluble cathode material such as thionyl chloride, $SO_2$ or polysulfides of the form $Li_2S_x$. Li dinitramide can be used as an additive to passivate a Li anode and to replace or compliment other known SEI layer promoters, e.g., ethylene carbonate, 1,3-dioxolane, carbon dioxide, ethylene sulfite, etc. Solvents forming poor SEI layers such as 1,2-dimethoxyethane (DME) or propylene carbonate, PC, can be used with these novel additives to provide high rate capability and high utilization of active material such as sulfur (~70%), by stabilizing long chain Li polysulfides species in solution.

A balanced Li/S cell employing a combination of DME and DOL electrolyte solvents yields 40-55% of sulfur utilization and 150-200 Wh/kg. Higher utilization of sulfur requires formation of reactive S species. These reactive species are more prone to react directly with the anode, resulting in self-discharge.

Reactive S species require a strong SEI layer to protect the anode. Stronger SEI promoters are needed than DOL. Usually it is combined with additional SEI forming compounds that enhance its action. The requirements for such SEI promoters are:

Fast passivation of Li surface blocking access of $Li_2S_x$ species and blocking further reaction with the oxidizing SEI promoter.

Good Li ion conductivity of the SEI layer resulting in low anode polarization.

High efficiency at low concentrations, so safety of the product is not compromised by addition of excess oxidizing SEI promoter.

Neat Li dinitramide is a strong oxidizer stable up to 160° C. It is most stable in dilute concentrations, with good solubility in organic electrolytes. It is a stronger oxidizer than liquid cathode S species and solvents towards Li.

It is believed that nitramide or products of its reactions act by forming a thin, dense oxide/nitride mixed layer on the Li surface. Li dinitramide helps to protect the Li surface from depassivation by high order Li polysulfides, e.g. $Li_2S_8$. High solubility of Li dinitramide in organic solvents provide flexibility if the oxidizer along with lithium cation needs to be introduced. High solubility supports low temperature operation. The protective layer on the Li surface actively reforms and repairs during charge and discharge of the anode. This layer is highly conductive for Li ions.

Figure 1:
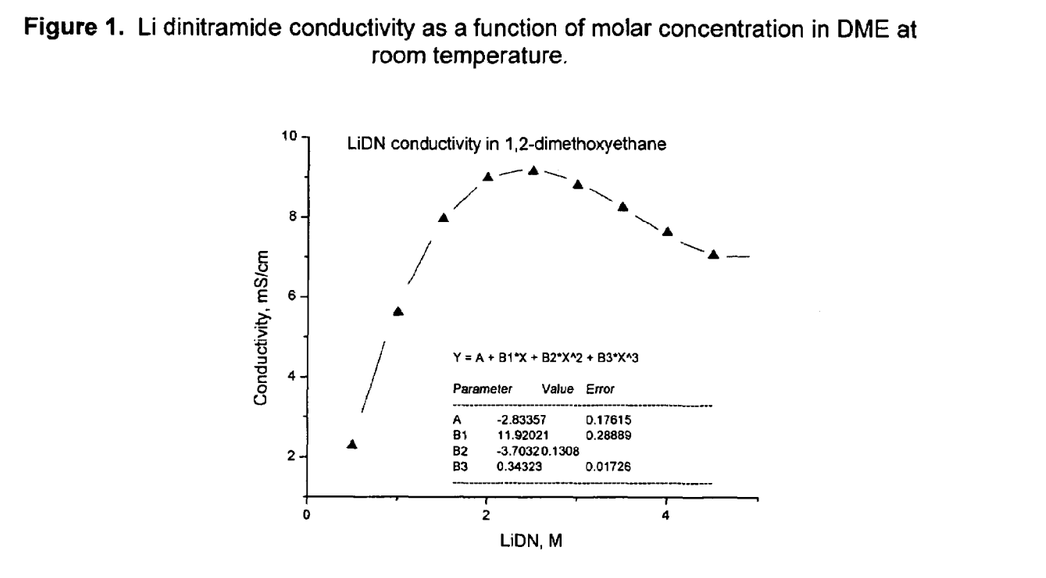
FIG. 1 is a graph showing the conductivity of a mixture of Li dinitramide and 1,2 dimethoxyethane as the concentration of the salt is varied.

Referring now to FIG. 1, a graphical depiction of a mixture of Li dinitramide and 1,2 dimethoxyethane is shown, as the salt concentration is varied. A conductivity maximum of about 9 mS/cm occurs at a Li dinitramide concentration of about 2.5 M.

To better underscore the unexpected benefits and novelty of the instant disclosure it is helpful to re-trace the developmental path and history behind this synthesis. Significantly, the objects of the original process were rocket fuels.

The ammonium salt of dinitramide was first synthesized in 1971 by O. Lukyanov and V. Tartakovsky in Zelinski Institute of Organic Chemistry (USSR) in the search for novel environmentally safe, halogen free oxidizers for solid rocket fuels. The starting material was n-butylcarbamate and the reaction path was:

The salts of dinitramide were found to be stable, safe and non-toxic compounds. Li dinitramide is stable up to 160-200° C. (the Li melting point is 180° C.). The ammonia and hydrazine salts of dinitramide were used in the USSR in the 1980's as highly energetic rocket fuel oxidizers replacing perchlorate salts.

The chemistry and technology of dinitramide salts remained classified until 1993. In 1993 J. Bottaro, et al., at SRI International disclosed in U.S. Pat. No. 5,254,324 dinitramide salts and method of making the same. Methods of dinitramide synthesis remained complicated and expensive until sulfamic acid was identified as starting material.

The preferred starting material for dinitramide synthesis is sulfamic acid. Langlet, et al., identified this starting material in 1999. The sulfamic acid process originally developed for ammonium dinitramide, U.S. Pat. No. 5,976,483, Langlet, et al., is modified here to produce Li dinitramide starting from potassium or lithium sulfamate:

In this process, lithium or potassium sulfamate is nitrated with a mixture of nitric acid, sulfuric acid and $SO_3$ at minus 35° C. to minus 40° C. followed by neutralization by lithium or potassium hydroxide. If potassium salt is obtained than it is converted to lithium dinitramide using lithium sulfate.

The concentration of forming dinitramidic acid is monitored by UV-spectra. When the concentration of dinitramidic acid reaches its maximum the reaction mixture is diluted by ice/water and then neutralized by concentrated LiOH/ice or KOH/ice. The reaction mix is concentrated and dinitramide salt is extracted into organic solvent followed by crystallization and purification steps.

The dinitramide salt is next combined with electrolyte solvents and optional salts. Exemplary solvents of this invention are ethylene carbonate, propylene carbonate, ethylmethylcarbonate, dimethylcarbonate, tetrahydrofuran, 2-methyltetrahyrofuran, 1,2-dimethoxyethane, 1,3-dioxolane, γ-butyrolactone, methylformate, NNN'N'-tetramethylethylenediamine and the like. Exemplary Li salts of this invention are $LiPF_6$, $LiBF_4$, lithium trifluoromethanesulfonimide, lithium triflate, lithiumoxaloborate, lithium perchlorate, $LiAsF_6$ as well as corresponding salts depending on the choice of negative electrode metal other then the lithium.

Nitramide compounds are introduced into an alkaline battery preferably as part of electrolyte solution or by other appropriate means including pretreatment of battery electrodes or as its component. Nitramide compounds provide ionic conductivity, support battery cycling and improve its performance.

Figure 2:
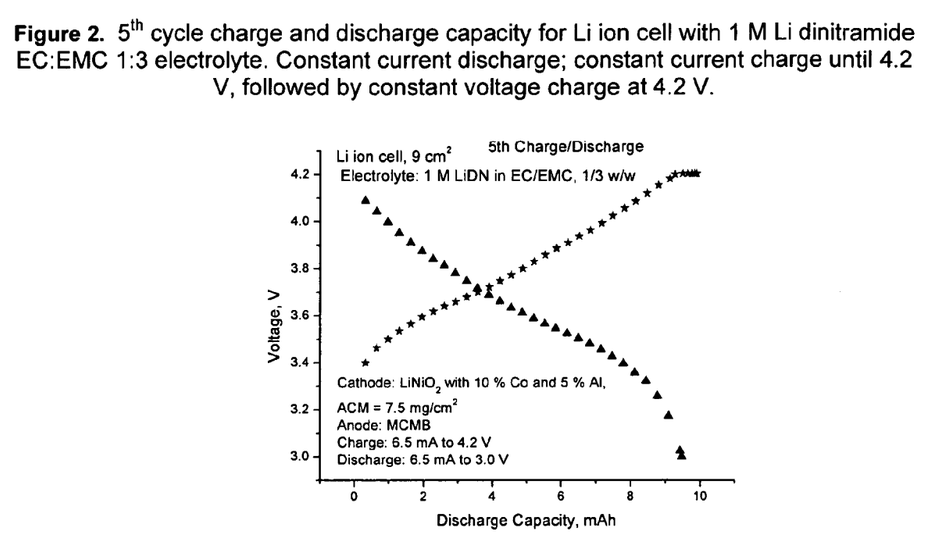
FIG. 2 is a graph of the 5th cycle charge and discharge capacity for a Li ion cell with 1 M Li dinitramide in EC:EMC 1:3 electrolyte.

Referring now also to FIG. 2, further technical details are disclosed.

Table 1 summarizes the conductivity and density of LiDN solutions as a function of its concentration in PC/DME, 1/1, mole/mole.

TABLE 1

Conductivity and density of LiDN solutions in PC/DME, 1/1, mole/mole.

| Solvent/LiDN | Concentration | | | density | conductivity |
|---|---|---|---|---|---|
| (mole/mole) | (M/kg) | (M/L) | (%, w/vol) | (g/mL) | (mS/cm) |
| 2 | 3.3 | 4.3 | 48.1 | 1.300 | 3.5 |
| 4 | 2.0 | 2.3 | 26.3 | 1.160 | 5.9 |
| 6 | 1.5 | 1.7 | 18.7 | 1.143 | 6.7 |

TABLE 1-continued

Conductivity and density of LiDN solutions in PC/DME, 1/1, mole/mole.

| Solvent/LiDN | Concentration | | | density | conductivity |
|---|---|---|---|---|---|
| (mole/mole) | (M/kg) | (M/L) | (%, w/vol) | (g/mL) | (mS/cm) |
| 12 | 0.8 | 0.9 | 9.6 | 1.080 | 6.8 |
| 24 | 0.4 | 0.4 | 5.0 | 1.064 | 5.1 |

Table 2 shows LiDN conductivity in various electrolyte solvents at room temperature.

TABLE 2

LiDN conductivity in electrolyte solvents at room temperature.

| Solvent | Conductivity, mS/cm @ 1 M LiDN |
|---|---|
| PC:DME 1:1 v/v | 7.3 |
| PC | 3.3 |
| DME | 5.0 |
| EC:EMC 1:3 w/w | 3.8 |
| PC:EMC 1:3 w/w | 6.2 |

The following examples are given by way of illustration of present invention and therefore should not be construed to limit the scope of the present invention.

EXAMPLE I

Synthesis of Lithium Dinitramide 20.0 mL of oleum (30% $SO_3$, density 1.902 g/mL) and 55.5 mL of fuming nitric acid (density 1.46 g/mL) were mixed in a flask equipped with high torque mechanical stirrer and cooled to minus 40° C. using dry ice/ethanol bath. Potassium sulfamate (21.0 g) was added in ~1 g portions in 16 min while the reaction temperature fluctuated between minus 35° C. and 42° C. The reaction mixture was stirred for additional 35 min. at minus 38° C. to minus 40° C. To follow the reaction, samples of reaction mixture (0.1-0.15 g) were taken every 5 min., mixed with 100 mL of water, and absorbance of the sample at 285 nm was measured and normalized by sample weight. The maximum specific absorbance at 285 nm corresponded to the maximum yield of dinitramide salt. The reaction mixture was poured into 416 g of crushed ice and neutralized to pH 7.0 using a solution of 155 g of KOH in 310 g of water cooled to minus 10° C. The dilution and neutralization was performed under intensive stirring and cooling with an external dry ice/ethanol bath.

The neutralized solutions from two identical nitrations were evaporated to dryness, extracted with acetone (150+2× 50 mL) and filtered. Acetone extract was evaporated to 40 mL and potassium dinitramide crystalized from 50 mL of 2-propanol and dried in a vacuum oven at 60° C. Yield of KDN was 15.2 g (34%). Next, 10.2 g of $Li_2SO_4$ and 6.7 g of potassium dinitramide were dissolved in 50 mL of water and 225 mL of 2-propanol was added. The solids were separated, filtrate evaporated, redissolved in 25 mL of 2-propanol, filtered and concentrated again. Yield was 6.4 g of LiDN*$H_2O$, needle like crystals. LiDN was dried in the vacuum oven, inside an argon filled glove box, by gradually increasing the temperature over $P_2O_5$ from 55° C. to 65° C. and finally to 100° C. in 48 hrs. Yield of LiDN was 4.7 g (89%).

EXAMPLE II

Li dinitramide was synthesized, mixed with electrolyte solvents, and the conductivity of the resulting electrolyte was measured. Conductivity of Li dinitramide as a function of molar concentration in DME at room temperature is presented in FIG. 1. Tables 2 and 3 show this salt is highly soluble in many solvents used in the Li battery industry with a conductivity maximum of ~7 mS/cm. Table 1 shows LiDN conductivity in PC/DME, 1/1, mole/mole. Table 2 shows LiDN conductivity in several electrolyte solvents at room temperature.

EXAMPLE III

Li dinitramide was synthesized as in Example I. It was found to passivate Li metal in aprotic solvents used in lithium batteries such as propylene carbonate, ethylmethylcarbonate, dimethylcarbonate, tetrahydrofuran, 1,3-dioxolane. It was not found to be an oxidizer to these solvents at RT to 60° C. Properties of Li dinitramide are summarized in Table 3.

TABLE 3

Thermal stability and room temperature solubility.

| Property | Solvent | Value |
|---|---|---|
| Melting point | Neat | 150 C. |
| Decomposition | Neat | 160-200 C. |
| Decomposition | PC, 5% solution | >200 C. |
| Solubility | Organic | 2-3 M |

Table 4 shows more detailed differential scanning calorimetery (DSC) results for thermal properties of Li dinitramide solutions. The neat Li dinitramide decomposition peak was relatively small (617 J/g) and was the same or reduced in the presence of electrolyte components (504-580 J/g) at 20% of Li dinitramide. In the diluted (2.5% of Li dinitramide) solutions the exothermal peak was dramatically reduced in tetraglyme (4G) or not detected in carbonates (PC, EC, and DMC).

TABLE 4

The DSC data relevant to exothermic decomposition of Li dinitramide in electrolytes compared with pure compound.

| Solvent | Li dinitramide (% w/v) | Exotherm Peak Position (° C.) | Li dinitramide Heat Flow J/g |
|---|---|---|---|
| PC | 2.5 | — | — |
| EC/DMC | 2.5 | — | — |
| 4G | 2.5 | 146.6 | 159.0 |
| 4G | 10 | 203.5 | 583.2 |
| 4G | 20 | 203.0 | 504.3 |
| n/a | 100 | 198.0 | 616.7 |

EXAMPLE IV

Li dinitramide was tested to determine effectiveness as a single Li salt and as an electrolyte component additive in Li ion cells. It was discovered that LiDN can be used alone in high concentrations or as an electrolyte additive, in low concentrations. Test Li ion cells had lithiated carbon anodes, and cell format was prismatic, with 9 cm² area. The cathodes were coated on aluminum foil and the anodes were coated on copper foil. Cathodes were $LiNiO_2$ with 10% cobalt and 5% Al oxide, active cathode material loading was ~7.5 mg/cm2. The anode was meso carbon micro bead (MCMB) based. The electrolyte was 1 M Li dinitramide in EC/EMC, 1/3. Cells were assembled with a Celgard 2320 separator into a pouch cells using PET/Al/PP 75 micron battery type packaging material (Sumitomo) and a vacuum heat sealing machine (Aline TC 420). Final cell assembly with the Li anode and electrolyte filling were performed in an argon filled glove box.

Figure 3:
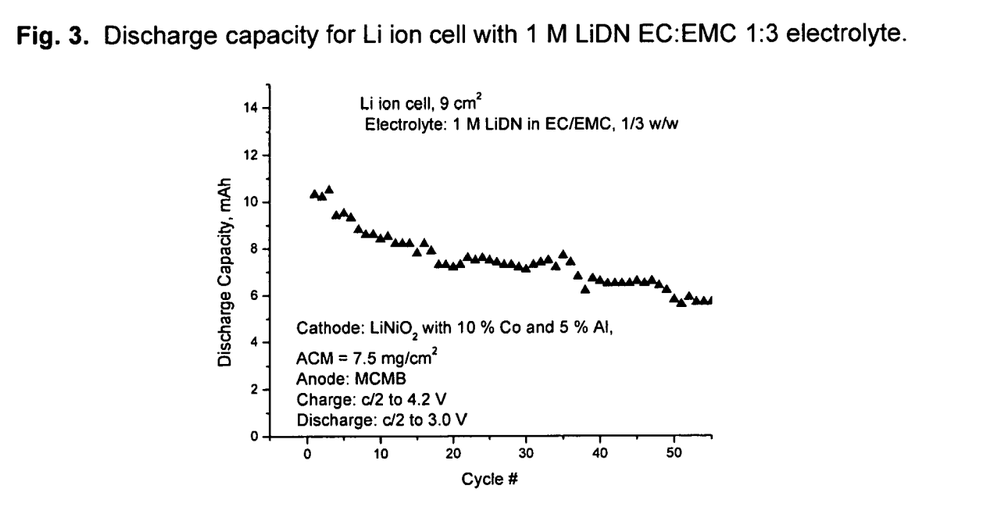
FIG. 3 is a graph of LiDN support cycling of a Li-ion cell as a single Li salt. The electrolyte is 1 M Li dinitramide in EC:EMC 1:3 electrolyte.

After formation, cells were discharged to 3.0 V and taper charged to 4.2 V. Nominal current was 6.5 mA. FIG. 2 shows $5^{th}$ cycle charge and discharge capacity for a Li ion cell with 1 M Li dinitramide EC:EMC 1:3 electrolyte. LiDN was the only salt used. Charge efficiency was high. FIG. 3 shows cycling data for a Li ion cell with 1 M LiDN EC:EMC 1:3 electrolyte. In these experiments LiDN was able to support Li ion cell operation for more than 100 cycles. Similar experiments were performed in 1.0 M $LiPF_6$, EC:EMC 1:3 and 1.0 M $LiPF_6$, 0.2 M Li dinitramide, EC:EMC 1:3. The Li dinitramide appeared completely compatible with the $LiPF_6$ system. These results show Li dinitramide can function in the Li ion cell as a sole Li salt and as an additive.

EXAMPLE V

Li dinitramide was tested as an electrolyte additive in Li/S cells of prismatic, 9 cm² format. The cathodes were elemental sulfur based and the anodes were Li metal foil purchased from FMC. Both paste and slurry coated cathodes were used (thick and thin cells, respectively.) Slurry cathodes contained sulfur/carbon black 72%/28% and were made with loadings of 0.4 to 0.8 mg/cm² of active material. Slurry was coated on a single side of 15 um, carbon coated aluminum foil. Paste electrodes were made with active material loading of 17 to 19.2 mg/cm² using an extrusion technique. The paste electrodes were calendered into a stainless steel, expanded metal, current collector. Sulfur content in these electrodes was 65 wt % with carbon black and Teflon binder to make the balance. Electrodes were spot welded to battery tabs (Sumitomo) having a polypropylene copolymer liner. Slurry coated cells were single sided and paste cells were double sided (18 cm² total surface). Cells were assembled with a Celgard 2320 separator into a pouch cells using PET/Al/PP 75 micron battery type packaging material (Sumitomo) and a vacuum heat sealing machine (Aline TC 420).

Final cell assembly with the Li anode and electrolyte filling were performed in an argon filled, glove box. Electrolyte was 1M Li imide, DOL:DME 1:4 with 0.2 M Li dinitramide additive. Control cells were filled with same electrolyte without dinitramide additive. Slurry cathode cells were discharged at 0.95 mA/cm² to 1.8 V and charged at 0.5 mA/cm² to 2.6 V or until 1350 mAh/g charge had passed.

Control cells accepted full charge of 1350 mAh/g in the experiment. Fifth cycle discharge capacity was 965 mAh/g or 58% of sulfur utilization. Charge efficiency was 71%. Cells with dinitramide additive accepted only 1241 mAh/g of charge capacity and discharge capacity was 1240 mAh/g or 74% of sulfur utilization (FIG. 4).

Figure 5:
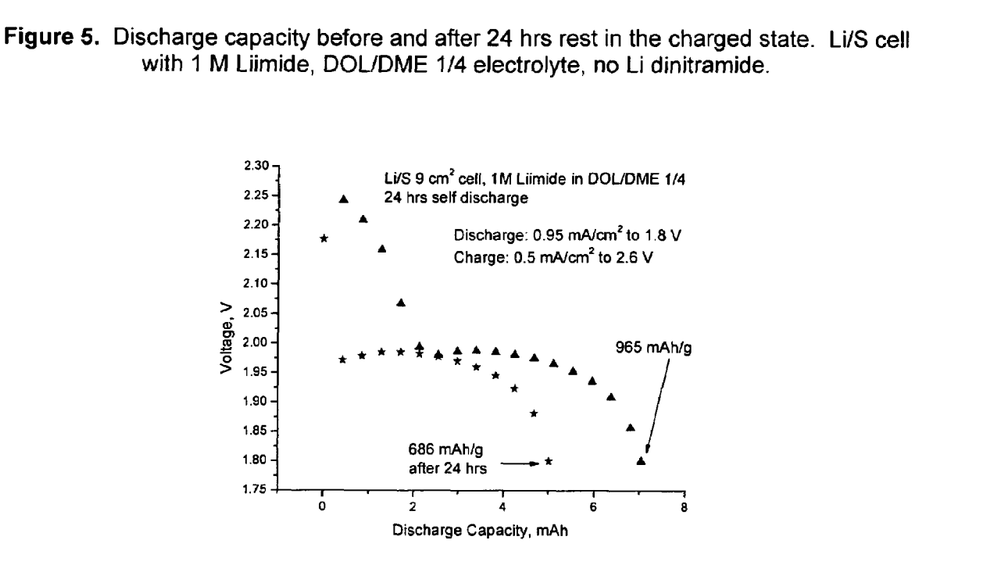
FIG. 5. is a graph of discharge capacity before and after 24 hrs. rest in the charged state. Li/S cell with 1 M Li imide, DOL/DME 1/4 electrolyte, no Li dinitramide.

Charge efficiency was 99.8% with a lowest value of 97% in sister cells. FIG. 5 shows discharge capacity before and after 24 hrs. rest in the charged state for control cells. Twenty-four hrs. self discharge in control cell was 29% compared with a 1 week self discharge of only 6.3% average in 2 cells with nitramide additive.

Figure 4:
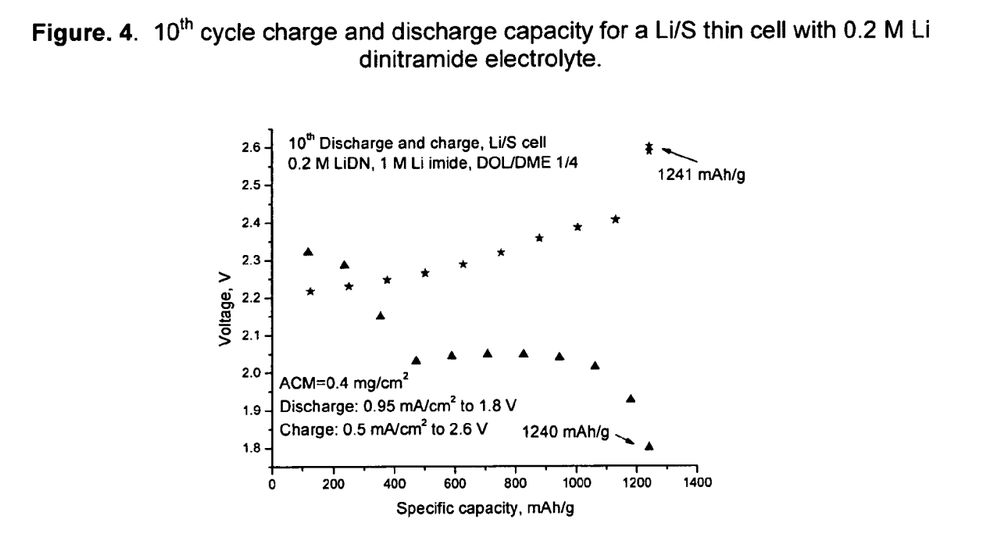
FIG. 4 is a graph of the 10th cycle charge and discharge capacity for a Li/S thin cell with 0.2 M Li dinitramide electrolyte.

FIG. 4 shows specific charge vs. discharge or input vs. output for a Li/S battery. Active material utilization of 1240 mAh/g (74%) and charge efficiency ~99% was demonstrated with nitramide additive. Without nitramide additive, charge efficiency was 95-98% up to 800 mAh/g of sulfur (50% utilization). At 1200 mAh/g, charge efficiency dropped close to zero, because the SEI layer is effectively broken by highly reactive cathode species. On the other hand, with Li dinitramide as electrolyte additive, charge efficiency remained constant at low and high levels of cathode utilization up to ~1250 mAh/g. It is suggested that strong oxidative agents such as nitramide and dinitramide derivatives will provide higher cathode material utilization in other cathode/anode pairs.

It is appreciated that various modifications to the inventive concepts described herein may be apparent to those of ordinary skill in the art without departing from the spirit and scope of the present invention as defined by the appended claims.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. An electrochemical cell, comprising, in combination:
   a negative electrode containing at least one of an alkali metal, an alkali metal alloy, and material intercalating alkali metal;
   a positive electrode comprising a cathode active material which electrochemically reacts with alkali metal or intercalates an alkali metal;
   an electrolyte that activates negative and positive electrodes; and,
   at least one salt selected from the group consisting of dinitramide and nitramide salts of alkali and alkali earth metals, wherein each of the dinitramide salts (structures 1 and 3 below) and nitramide salts (structures 2 and 4 below) is represented by a following formula:

1

2

-continued wherein $R_1$ is a metal including alkali and alkaline earth metals, and R is an inorganic or organic group.

2. The electrochemical cell of claim 1, wherein the electrolyte solvents are selected from the group consisting of organic ethers, esters, carbonates, and acetals such as 1,2-dimethoxyethane, diglyme, triglyme, tetraglyme, ethylene carbonate, propylene carbonate, dimethyl carbonate, tetrahydrofuran, and dioxolane.

3. The electrochemical cell of claim 1, wherein the electrolyte solvent is water.

4. The electrochemical cell of claim 1, wherein the electrolyte is a mixture of molten salts.

5. The electrochemical cell of claim 2, wherein the alkali metal salt of the at least one salt of a dinitramide and a nitramide is the only salt providing ionic conductivity.

6. The electrochemical cell of claim 3, wherein the alkali metal salt of the at least one of a dinitramide and a nitramide is the only salt providing ionic conductivity.

7. The electrochemical cell of claim 4, wherein the alkali metal salt of the at least one salt of a dinitramide and a nitramide is used in a mixture of other alkali metal salts.

8. The electrochemical cell of claim 2, wherein the alkali metal salt of the at least one salt of a dinitramide and a nitramide is used in a mixture of other alkali metal salts.

9. The electrochemical cell of claim 3, wherein the alkali metal salt of the at least one salt of a dinitramide and a nitramide is used in a mixture of other alkali metal salts.

10. The electrochemical cell of claim 2, wherein the negative electrode is lithium metal.

11. The electrochemical cell of claim 3, wherein the negative electrode is lithium metal.

12. The electrochemical cell of claim 4, wherein the negative electrode is lithium metal.

13. The electrochemical cell of claim 2, wherein the positive electrode comprises a positive electrode active material of at least one of sulfur and sulfur containing material.

14. The electrochemical cell of claim 13, wherein the positive electrode active material is mixed with a conductive additive selected from the group consisting of acetylene black, carbon black, graphite, nickel powder, aluminum powder, titanium powder, stainless steel powder, and mixtures thereof.

15. The electrochemical cell of claim 5, where the alkali metal salt of the at least one salt of a dinitramide and a nitramide is a lithium salt.

16. The electrochemical cell of claim 9, wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiSO_3\ CF_2\ CF_3$, $LiC_6F_5SO_3$, $LiO_2CCF_3$, $LiSO_3F$, $LiB(C_6H_5)_4$, $LiCF_3SO_3$, and mixtures thereof.

17. The electrochemical cell of claim 7, wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiSO_3\ CF_2\ CF_3$, $LiC_6F_5SO_3$, $LiO_2CCF_3$, $LiSO_3F$, $LiB(C_6H_5)_4$, $LiCF_3SO_3$, and mixtures thereof.

18. The electrochemical cell of claim 8, wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiSO_3\ CF_2\ CF_3$, $LiC_6F_5SO_3$, $LiO_2CCF_3$, $LiSO_3F$, $LiB(C_6H_5)_4$, $LiCF_3SO_3$, and mixtures thereof.

19. The electrochemical cell of claim 2, wherein the negative electrode comprises a negative electrode active material selected from the group consisting of coke, carbon black, graphite, acetylene black, carbon fibers, glassy carbon, meso carbon micro beads, lithium silicon, or lithium tin composites and alloys and mixtures thereof.

20. The electrochemical cell of claim 2, wherein the positive electrode comprises a positive electrode active material selected from the group consisting of lithiated oxides, lithiated sulfides, lithiated selenides and lithiated tellurides of the group selected from vanadium, titanium, chromium, copper, molybdenum, niobium, iron, iron phosphate, nickel, cobalt, manganese, and mixtures thereof.

* * * * *